United States Patent
Butt

[19]

[11] Patent Number: 6,106,648
[45] Date of Patent: Aug. 22, 2000

[54] METHOD OF REBUILDING A DAMAGED LENS OF A VEHICLE LAMP

[76] Inventor: Tahir Mahmood Butt, P.O. Box 884, Manama, Bahrain

[21] Appl. No.: 09/046,664

[22] Filed: Mar. 24, 1998

Related U.S. Application Data

[60] Provisional application No. 60/052,729, Jul. 7, 1997.

[51] Int. Cl.[7] .................................................... B32B 35/00
[52] U.S. Cl. ............................. 156/98; 428/63; 29/402.11
[58] Field of Search .......................... 156/94, 98; 428/63; 29/402.04, 402.11

[56] References Cited

U.S. PATENT DOCUMENTS

| | | |
|---|---|---|
| 3,138,505 | 6/1964 | Hirsch . |
| 3,388,016 | 6/1968 | Murray et al. . |
| 3,478,791 | 11/1969 | Elmendorf . |
| 3,551,242 | 12/1970 | Boeke . |
| 3,741,853 | 6/1973 | Forsythe et al. . |
| 3,850,718 | 11/1974 | Trapani . |
| 4,028,160 | 6/1977 | Golumbic . |
| 4,086,113 | 4/1978 | Cataffo et al. . |
| 4,147,576 | 4/1979 | Beem et al. . |
| 4,497,755 | 2/1985 | Korsyn ...................................... 425/11 |
| 4,652,319 | 3/1987 | Hammond . |
| 4,661,182 | 4/1987 | Lerner . |
| 4,692,195 | 9/1987 | Allen et al. . |
| 5,401,152 | 3/1995 | Jacino et al. ............................... 425/12 |
| 5,569,346 | 10/1996 | Marshall .................................... 156/94 |
| 5,955,113 | 9/1999 | Jacino ....................................... 156/94 |

*Primary Examiner*—Michael W. Ball
*Assistant Examiner*—Michael A. Tolin
*Attorney, Agent, or Firm*—Arent Fox Kintner Plotkin & Kahn, PLLC

[57] ABSTRACT

The method is for partially or completely rebuilding a damaged lens of a vehicle lamp, particularly a lens having an interior surface with a pattern of optical dispersion elements. It allows to inexpensively rebuild a lens, such as the lens of a tail lamp or signal lamp. A thermoplastic lens obtained with the present method can also be used to replace a broken glass lens of a headlamp. In the method, a patch of a flat thermoplastic material is provided to replace the damaged section of the lens or, in some cases, the whole lens. The patch is grooved to duplicate the pattern of optical dispersion elements. In case the damaged section or lens to be replaced is not flat, the patch is heat softened and shaped with the use of a mould created from the damaged section or lens. The patch is subsequently fixed to the housing. This method is simple, inexpensive and can be carried out locally whenever necessary.

13 Claims, 5 Drawing Sheets

METHOD OF REBUILDING A DAMAGED LENS OF A VEHICLE LAMP

CROSS-REFERENCE APPLICATION

The present application claims priority of provisional patent application Ser. No. 60/052,729 filed on Jul. 7, 1997.

FIELD OF THE INVENTION

The present invention relates to a method of partially or completely rebuilding a damaged lens of a vehicle lamp, particularly a lens having an interior surface with a pattern of optical dispersion elements.

BACKGROUND

Cars, buses, trucks, motorcycles or any other kind of vehicles generally comprise a plurality of lamps, such as headlamps, tail lamps or signal lamps, each covered by a transparent or translucent lens. Each lamp comprises a housing, a lens, a reflector and a lamp bulb. Adjacent lamps are often grouped together as a single lighting unit. Yet, the interior surface of a vehicle lens is rarely flat and almost always comprises a pattern of optical dispersion elements. The role of the dispersion elements is to provide an enhanced and more uniform distribution of the light.

Most of the lenses, such as the lenses for the tail lamps and signal lamps, are made of a plastic material which comes in three main groups of colours, namely red, amber and clear. The lens of a headlamp is generally made of clear glass. All these lenses may be damaged by a shock due to a small rock or the like thrown by a preceding vehicle and hitting the surface thereof. A damage may also result from a traffic accident or vandalism. Once a lens is damaged, the owner who wishes to correct the problem has hitherto to replace the whole lens or worse, replace the whole lamp or lighting unit if the lens is not individually available. The damaged lens, lamp or lighting unit is then thrown away, even if the damage to the lens is minor and the structure of the lamp or lighting unit is intact. The replacement of a damaged lens, lamp or lighting unit may be very expensive, depending on the models. Yet, some lenses, lamps or lighting units may not be readily available or even not available anymore in the case of older vehicles.

In order to avoid an expensive replacement of a lens, lamp or lighting unit, some owner uses a translucid tape to cover the damaged section of a lens. This latter solution is however not aesthetical and is only a sort-term solution to the problem. Moreover, the light distribution with a tape is less efficient.

It is thus an object of the present invention to provide a simple and inexpensive method of partially or completely rebuilding a damaged vehicle lens, particularly a lens having an interior surface with a pattern of optical dispersion elements. This method reduces the costs of repairing a damaged lens and provides an alternative to destruction of reusable parts, which would otherwise be sent to a dump site. The method can be used to replace a portion of the lens or the whole lens and can be carried out locally whenever necessary.

Accordingly, there is provided a method of rebuilding a damaged lens of a vehicle lamp, the lens having a side comprising a pattern of optical dispersion elements and being connected to a housing, the method comprising the steps of:

delimiting a damaged section to be removed from an undamaged section of the lens;

removing the damaged section from the housing;

providing a flat thermoplastic patch having a size and a colour corresponding to that of the damaged section;

grooving a side of the patch to duplicate the pattern of optical dispersion elements of the damaged section; and fixing the patch to the housing in replacement of the damaged section.

There is also provided a method of rebuilding a damaged lens of a vehicle lamp, the lens having a side comprising a pattern of optical dispersion elements and being connected to a housing, the method comprising the steps of:

removing the damaged lens from the housing;

providing a flat thermoplastic patch having a size and a colour corresponding to that of the damaged lens;

grooving a side of the patch to duplicate the pattern of optical dispersion elements of the damaged lens; and fixing the patch to the housing in replacement of the damaged lens.

A non restrictive description of a preferred embodiment will now be given with reference to the appended drawings.

DESCRIPTION

Whenever a damaged lens needs to be repaired, the first step is to evaluate the extent of the damages. The worker has to determine if the whole lens must be rebuilt or if an undamaged section may be saved. This depends on many factors, such as the size of the lens, the location of the broken area and the size of the section to be replaced. If a large section of the lens is intact, it is highly preferable that this section be saved. On the other hand, if the damage is extensive, a complete rebuilding of the lens should be considered. Yet, the method according to the present invention assumes that the housing of the given lamp or lighting unit is intact or may be repaired after the incident. Of course, if the housing is damaged beyond repairs, the replacement of the whole lamp or lighting unit should be considered.

The lens must of course be removed from the housing in case of a complete rebuilt. In the case of a partial rebuild of the lens, the undamaged section may be left on the housing of the lamp or lighting unit. In both instances, the lamp or lighting unit may be left on the vehicle. Nevertheless, it is generally more convenient to remove the lamp or lighting unit from the vehicle and to remove the damaged lens from the housing to which it is connected. Removing the lamp or lighting unit from the vehicle is usually done by removing screws. To remove the lens, it is sometimes necessary that the back side of the lamp or lighting unit be heated up until the silicone becomes soft enough so that the lens comes off upon pressing from the back side thereof with a sharp edged tool. Other lenses are simply detached from the housing by removing the screw or screws.

A partial rebuilt of a damaged lens requires that the damaged section and the undamaged section be delimited. The damaged section will eventually be replaced by a patch having a similar size, shape, colour and pattern. This patch may have a square, rectangle or curved shape. Other shapes are also possible. This delimitation may be done before of after removing the lens from the lamp or lighting unit.

Once the limit between the damaged and the undamaged section is chosen, the damaged section is removed away from the undamaged section. This may be done with the use of a cutter blade on a circular saw table, for instance. Alternatively, the damaged section may be cut away with a hand-held soldering iron.

Figure 1:
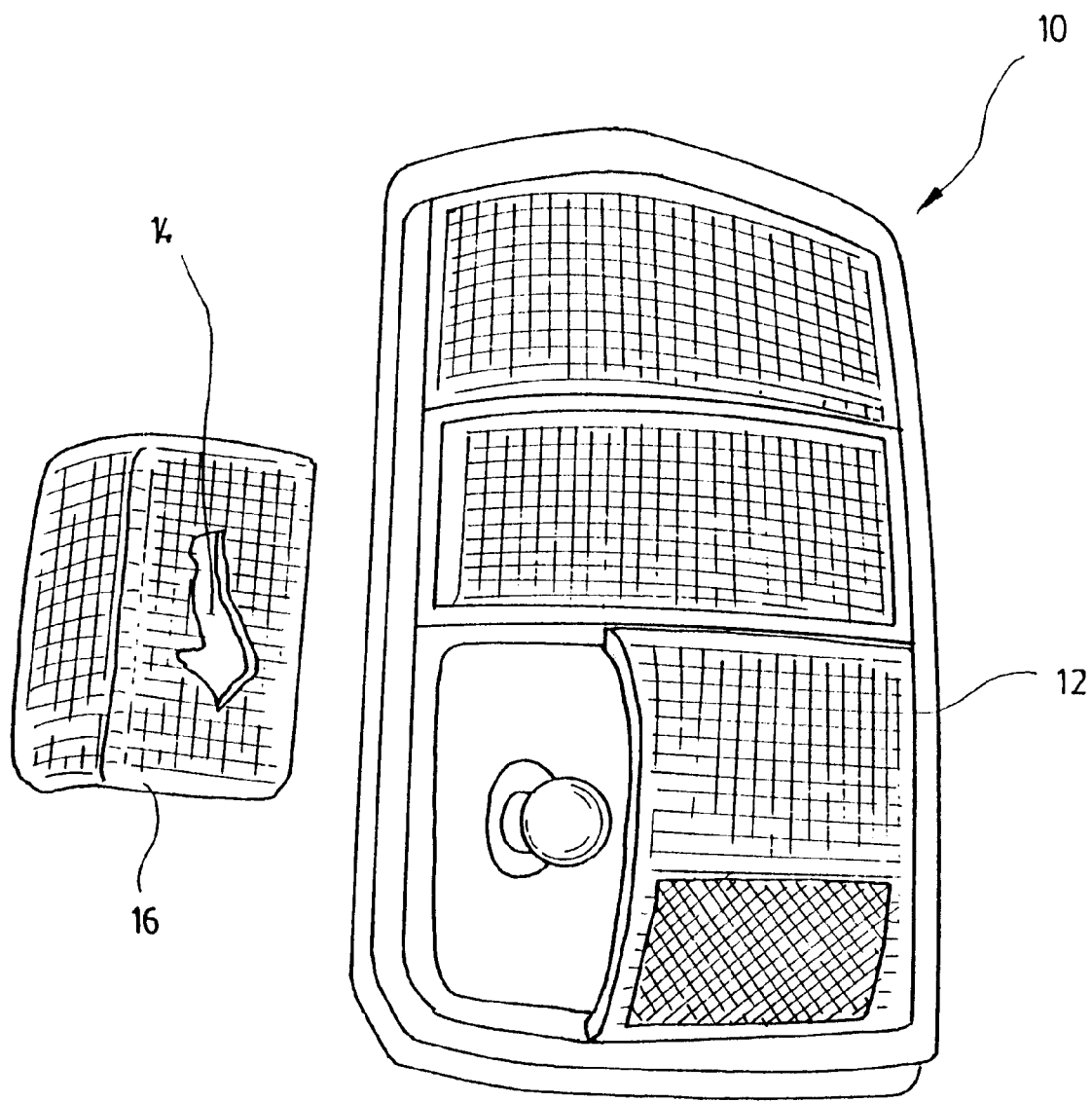
FIG. 1 is a perspective view of an example of a damaged lens on a lighting unit, showing the damaged section once cut away from an undamaged section of the lens.

FIG. 1 shows an example of lighting unit (10) where one of the lens (12) thereof has been broken. A partial rebuilt of the damaged lens (12) is sought as the broken area (14) is relatively small and located at one side of the lens (12). The damaged section (16) is delimited as a rectangle and is slightly larger than the broken area (14) so that the piece be subsequently used for moulding, as explained hereinafter.

The next step is to provide a flat thermoplastic patch having a size and a colour corresponding to that of the damaged section. The measures are taken on the damaged section or on the hole left by the removed damaged section. If appropriate, a scale can be used or, alternatively, a sketch can be drawn on paper using a pencil. Once the measures are taken, the appropriate patch of a thermoplastic material is chosen to match the colour of the damaged section. The thermoplastic material is preferably acrylic, which is usually provided in flat sheets. A piece of the sheet is then cut away according to the measures previously taken. The cutting needs only to be approximate and it is suggested that an oversize of about 2–3 cm be left all around. It will be later brought to the appropriate size.

Because each lens comprises a specific pattern of optical dispersion elements, in the form of intersecting sets of grooves, the pattern of the damaged section must be duplicated by grooving a side surface of the patch. The grooving step may be carried out with the use of a circular saw blade and an adjustable saw table. Mainly three types of circular blades are usually necessary to cut the grooves on the acrylic sheet: small, medium and big groove cutting. The blades are made of steel, preferably having between 4 and 5 inches in diameter and a thickness of 3 mm. The edges of the teeth of the blades are previously bevelled with a lathe to form a specific shape in the acrylic. The appropriate saw blade is installed in the saw table thereafter.

Figure 2:
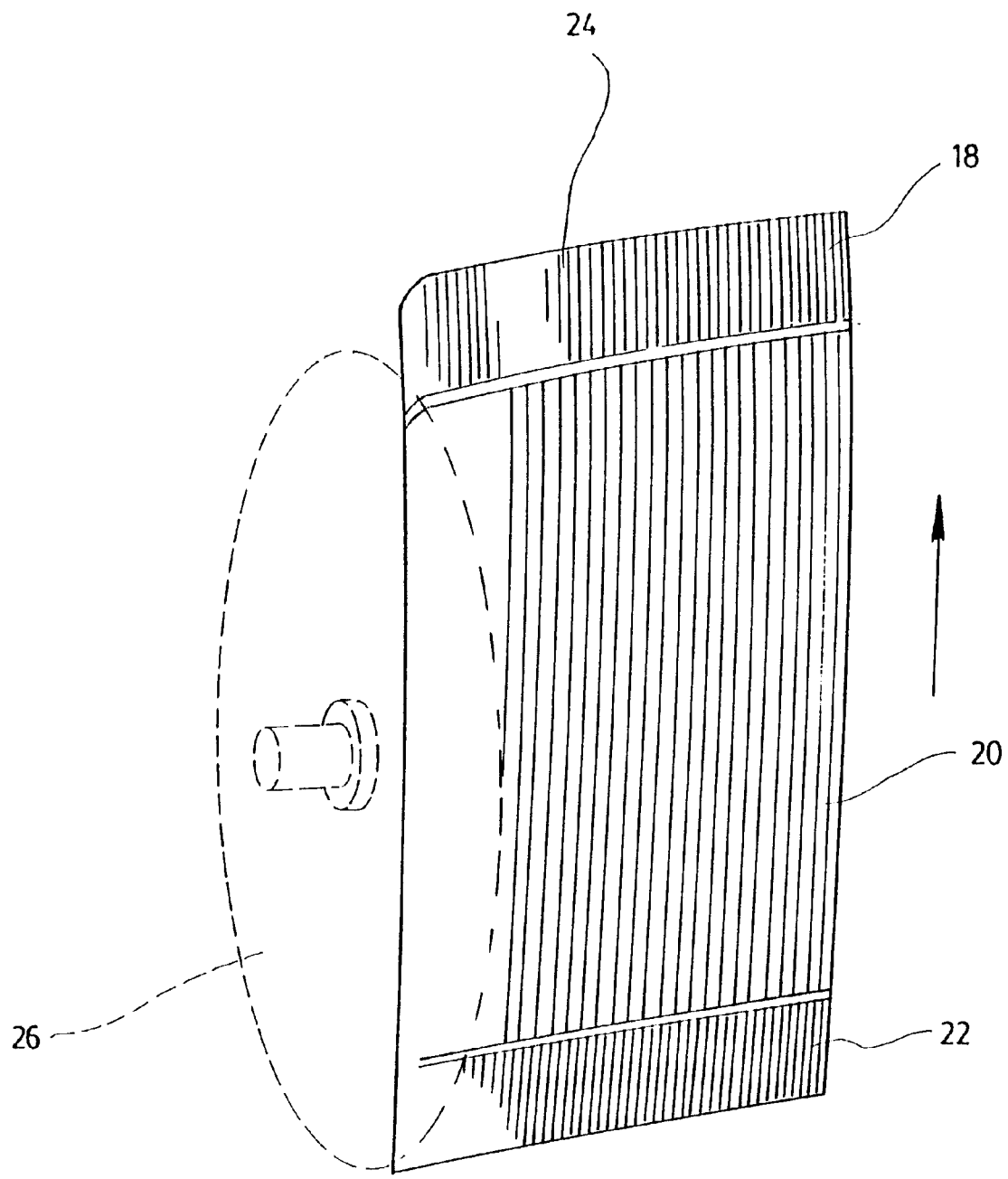
FIG. 2 is a perspective view of a patch while a set of grooves are formed using a circular saw blade.

To duplicate the pattern, the worker selects the appropriate saw blade and installs it on the saw table. The upper portion of the saw blade slightly protrudes from the working surface of the saw table. The parallel grooves are made in the patch by holding the patch with the hands or by using a suitable holding tool (not shown) and moving the patch relative to the saw blade. FIG. 2 illustrates a patch (18), on which sets of grooves (20,22,24) are made with a saw blade (26). The pattern is usually completed by another set of grooves (not shown), made in an orthogonal or diagonal manner. The intersections of the sets of grooves will form a pattern of teeth and bosses.

If the damaged section is curved, the patch has to be moulded to match the original shape thereof. Sometimes, large broken pieces have to be previously glued together for moulding purposes. The damaged section is then filled with white cement or the like to give it strength in view of the moulding. As aforesaid, the damaged section is advantageously larger than the actual broken area so that the resulting mould be more resistant.

Figure 3:
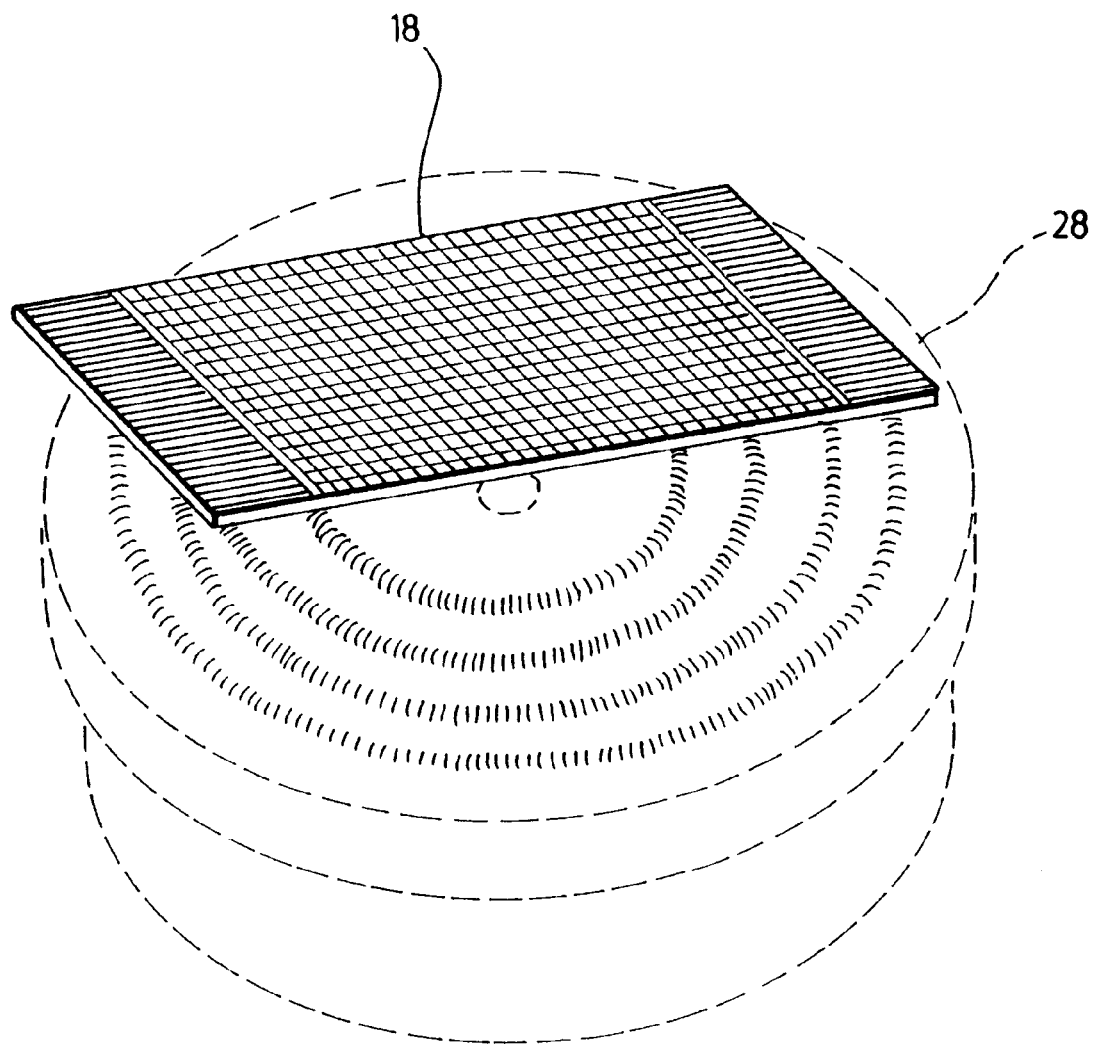
FIG. 3 is a perspective view of the patch on an heater coil.

The patch is preferably heat softened and shaped on the mould to match with the non-flat shape of the damaged section. A suitable tool for that purpose is a coil heater, such as the coil heater (28) illustrated in FIG. 3. The patch is then heated until it may be folded easily. Care must be taken while heating the acrylic patch to prevent the patch from burning. One way is to continuously flip the patch on the coil heater so as to heat it from both sides. The patch is held by hand or by pliers. The required shape is obtained by placing the hot patch on the mould and press it with a thick piece of cloth for a few minutes until it runs cold. This step may be repeated to obtain the final shape.

Once the patch is in the final shape, its edges are machined so that the patch be brought to a size where it will fit in place onto the housing. Machining the acrylic part from the sides is known as "shelding". The shelding is preferably achieved by using a bench grinder. More preferably, the bench grinder is a 1 HP double bench grinder with a 3000 rpm automatic clutch brake, with each shaft not exceeding 4 to 5 inches in length. One side of the shaft holds a disc plate. Instead of the cone, an adaptor is screwed on the shaft threads to hold a 5 mm thick, 10 inches in diameter, well polished from both sides iron disc plate with a one-inch centre hole. Sand abrasive cloths #3 or 4 are glued on both sides of the disc plate and allow the grinding of the acrylic patch and generate dust powder. The tool-user must be careful and alert while doing the shelding. The patch must be held firmly in both hands or with an appropriate tool (not shown). A light is advantageously placed nearby in order to continuously check the patch until it has the required dimension.

Once it is well from all sides, the patch is cleaned and shined. One way is to heat the grooved side of the patch on the coil heater and blow air from all sides so as to remove the unwanted dust powder that settled in. Additional cleaning may be necessary. The grooved side may be cleaned with a liquid solvent for acrylic, such as chloroform. The liquid is poured through a small nozzle-type filler plastic bottle and spread on the grooved part with a tool or a finger. The grooved part of the patch is then turned and heated again on the coil heater to restore the shine. While the cleaning step is going on, the liquid should not come in contact with the surface of the other side, otherwise it will make visible marks. The patch is ready to be fixed on the housing once the cleaning is over.

The bond of the patch with the housing or, alternatively, with the undamaged section and the housing, has to be strong. A good bonding adhesive fluid should be used, as apparent to a person skilled in the art. Preferably, the adhesive fluid is used with the thermoplastic dust powder taken out from cut away pieces of the sheet of raw material. The dust is obtained by holding a piece and press it on the running sand abrasive disc plate side. The dust is then collected and made finer, for instance by putting it on the palm of the worker's hand and rubbing it with the other palm. This will help to turn it into a powder-like substance. Each colour is always collected separately in a jar.

Figure 4:
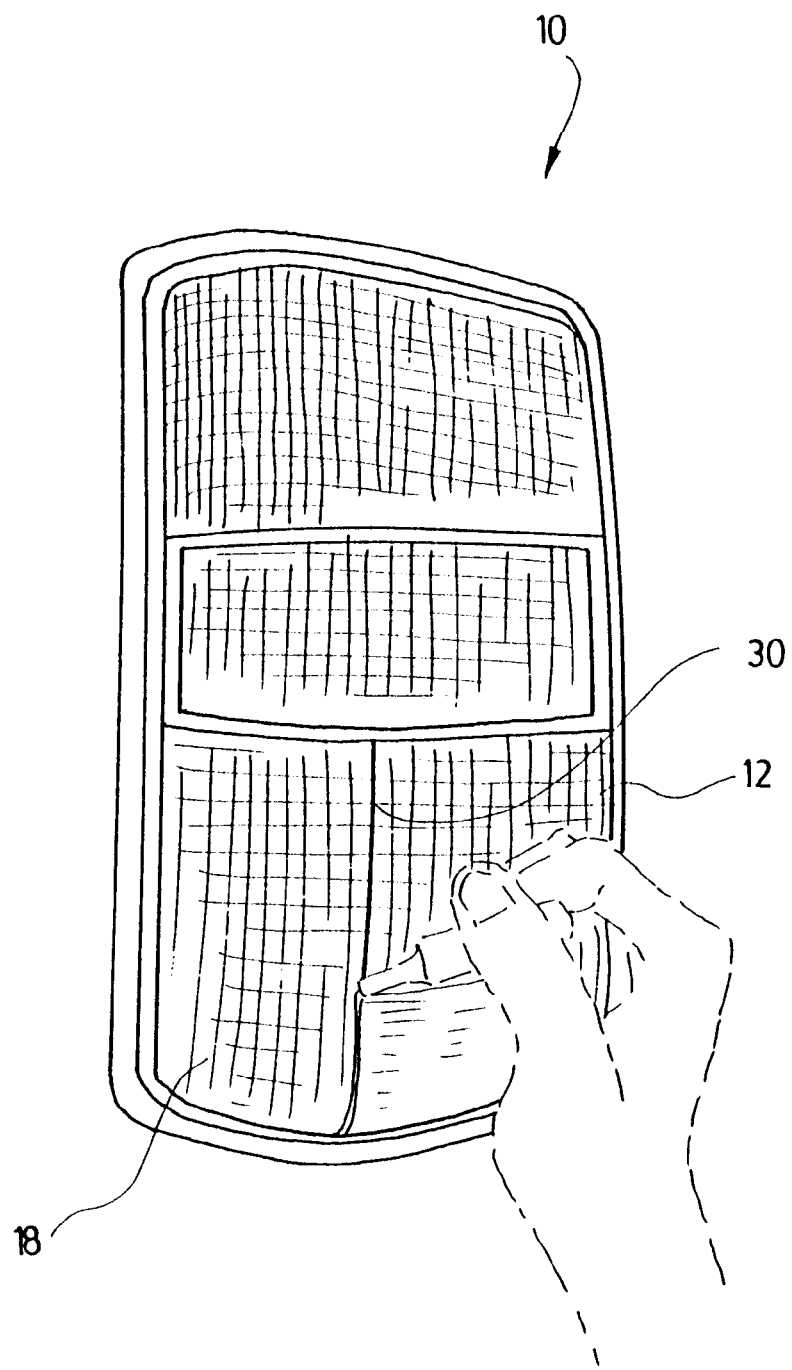
FIG. 4 is a perspective view of the step where the joint between the patch and the undamaged section of the lens is filled up with dust powder and where an adhesive fluid is poured thereon.

Preferably, when installing the patch in place, the joint or joints between the patch and the undamaged section of the lens are very slightly but thoroughly filled up with dust powder of the appropriate colour. As shown in FIG. 4, drops of the bonding adhesive fluid are subsequently applied on the powder and between the joint (30), just enough to make the powder wet. The patch is held in place for 2–3 minutes and let dry for at least 30 minutes. After 30 minutes, the powder should become hard and well settled in the joint or joints. The lens should now be cleaned and extra substances should be removed so as to have it even, like the balance lens. To do so, a blade may be used. Preferably, the blade has about 4 inches and is cut from a hacksaw blade with its teeth removed by grinding. It has a top sharp end used for cutting the hard and stiff powder, while the sides are used for buffing and to make the piece smooth. The unwanted film around the patch is buffed so as to make it even with the balance lens. For further smoothness and a beautiful finish, it is possible to use a small, square piece of about 3 inches water abrasive paper #220 or 400, dip the paper in water and rub on the joints and the patch itself. Once dried with a cloth, the repaired section of the lens or the lens unit should be very smooth and well settled.

If necessary, a sealant, such as silicone, may be added around the lens to hermetically seal the housing.

Figure 5:
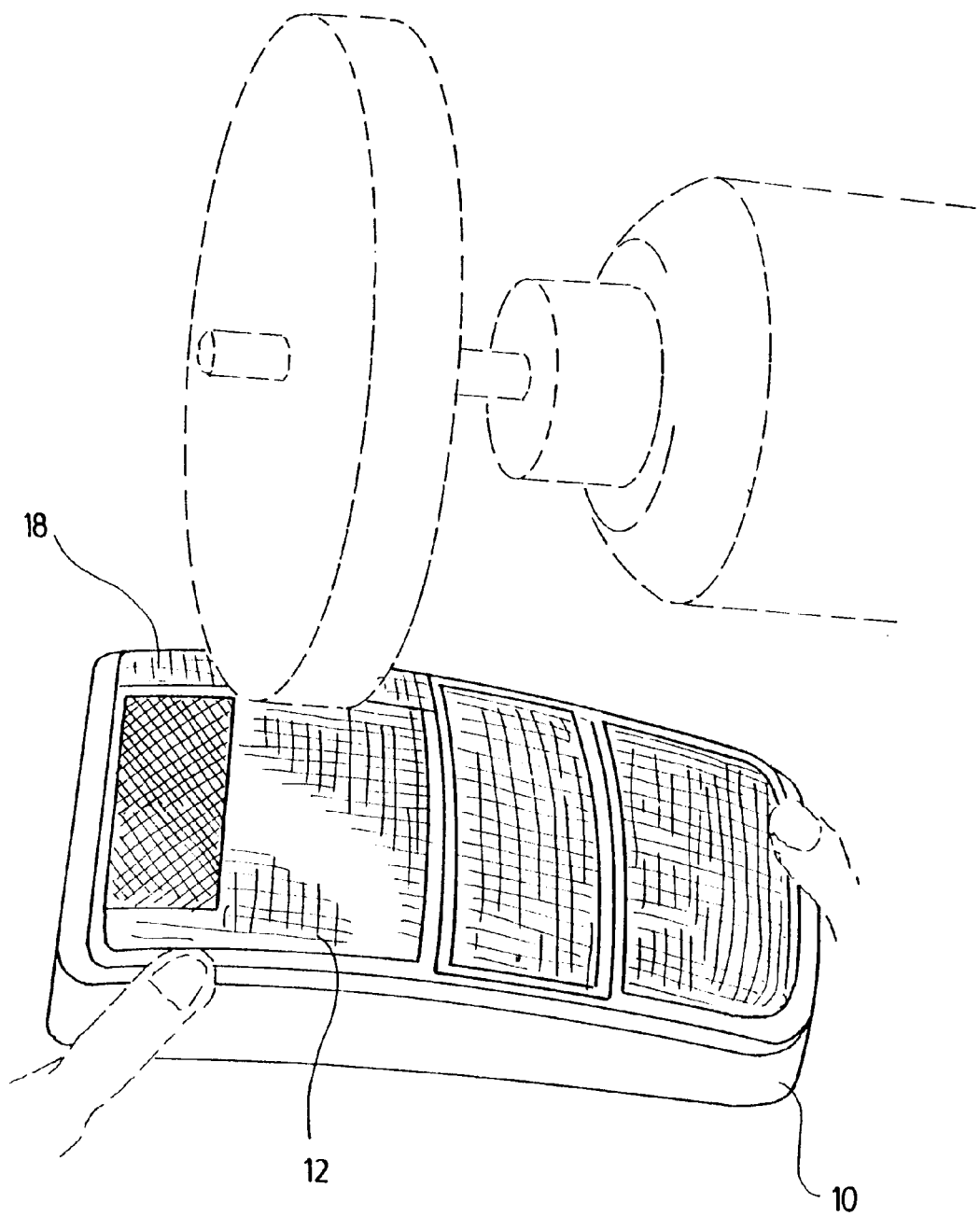
FIG. 5 is a perspective view of the polishing step.

The last step is to polish the repaired section on the bench grinder polishing side. A hand solid wax may be used, known as lustre polish and commonly used for polishing purposes. While the buffing polishing cloth is rotating, the wax is held firmly with both hands and lightly pressed on the cloth. The repaired section is subsequently pressed onto the running polish side of the cloth. One should be very careful not to take the lens above or directly under the running shaft but just in the centre, keeping a light horizontal movement for a perfect polish. If desired, and as shown in FIG. 5, the complete lighting unit (10) may be polished to make it all look shiny. After polishing, the lens is wiped out with a clean cotton cloth for a perfect look. A thin visible line should only be noticed if someone looks closely.

The present invention allows to inexpensively rebuild a lens of a vehicle lamp, such as a tail lamp or a signal lamp. A thermoplastic lens obtained with the present method can also be used to replace a broken glass lens of a headlamp.

Although a preferred embodiment of the invention has been described in detail herein and illustrated in the accompanying drawings, it is to be understood that the invention is not limited to this precise embodiment and that various changes and modifications may be effected therein without departing from the scope or spirit of the present invention. For instance, the order of some steps may be rearranged without changing the results. The patches may be provided in pre-cut pieces instead of large sheets. Other materials than acrylic may be used. The present invention may be carried out with other tools than the ones described herein.

What is claimed is:

1. A method of rebuilding a damaged lens of a vehicle lamp, the lens having a side comprising a pattern of optical dispersion elements and being connected to a housing, said method comprising the steps of:
removing the damaged lens from the housing; said damaged lens having a non-flat shape;
fixing together broken parts of the damaged lens;
filling the fixed together broken parts with a hardening filler to create a reference mould; providing a flat thermoplastic patch having a size and a colour corresponding to that of the damaged lens;
heat softening the patch and shaping it on the reference mould to match the non-flat shape of the damaged lens;
grooving a side of the patch to duplicate the pattern of optical dispersion elements of the damaged lens; and
fixing the patch to the housing in replacement of the damaged lens.

2. A method according to claim 1, including the additional step of machining edges of the patch to bring it to a smaller size where it fits onto the housing.

3. A method according to claim 1, including the additional step of cutting the patch from an acrylic sheet.

4. A method according to claim 1, including the additional step of cleaning the duplicated pattern of the patch with a cleaning solvent.

5. A method of rebuilding a damaged lens of a vehicle lamp, the lens having a side comprising a pattern of optical dispersion elements and being connected to a housing, the method comprising the steps of:
delimiting a damaged section to be removed from an undamaged section of the lens, said damaged section having a non flat shape;
removing the damaged section from the housing;
fixing together broken parts of the damaged section;
filling the fixed together broken parts with a hardening filler to create a reference mould;
providing a flat thermoplastic patch having a size and a colour corresponding to that of the damaged section;
heat softening the patch and shaping it on the reference mould to match the non-flat shape of the damaged section;
grooving a side of the patch to duplicate the pattern of optical dispersion elements of the damaged section; and
fixing the patch to the housing in replacement of the damaged section.

6. A method according to claim 5, including the additional step of removing the lens from the housing before removing the damaged section therefrom.

7. A method according to claim 6, including the additional step of fixing back the undamaged section of the lens to the housing before fixing the patch thereto.

8. A method according to claim 5, including the additional step of machining edges of the patch to bring it to a smaller size where it fits onto the housing.

9. A method according to claim 5, wherein the step of fixing the patch to the housing includes applying an adhesive fluid on a joint between the patch and the undamaged section.

10. A method according to claim 5, including the additional step of cutting the patch from an acrylic sheet.

11. A method according to claim 5, including the additional step of cleaning the duplicated pattern on the patch with a cleaning solvent.

12. A method of rebuilding a damaged lens of a vehicle lamp, the lens having a side comprising a pattern of optical dispersion elements and being connected to a housing, the method comprising the steps of:
delimiting a damaged section to be removed from an undamaged section of the lens;
removing the damaged section from the housing;
providing a flat thermoplastic patch having a size and a colour corresponding to that of the damaged section;
grooving a side of the patch to duplicate the pattern of optical dispersion elements of the damaged section; and
fixing the patch to the housing in replacement of the damaged section,
wherein the step of fixing the patch to the housing includes filling a joint between the patch and the undamaged section with a thermoplastic powder having a colour corresponding to the colour of the patch and subsequently applying an adhesive fluid on the powder.

13. A method according to claim 12, including the additional step of collecting a thermoplastic material and grinding it to produce the thermoplastic powder.

* * * * *